United States Patent
Erian

(10) Patent No.: US 9,731,822 B1
(45) Date of Patent: Aug. 15, 2017

(54) MODULAR TESTABLE RELEASE MECHANISM

(71) Applicant: The Boeing Company, Chicago, IL (US)

(72) Inventor: Hany F. Erian, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/085,735

(22) Filed: Mar. 30, 2016

(51) Int. Cl.
*B64D 1/12* (2006.01)

(52) U.S. Cl.
CPC ..................... *B64D 1/12* (2013.01)

(58) Field of Classification Search
CPC ........................................................ B64D 1/12
USPC ............. 294/82.26, 82.29, 82.36; 244/173.2, 244/173.3, 137.4; 89/1.57, 1.58; 403/322.1, 322.3, 325
See application file for complete search history.

(56) References Cited

U.S. PATENT DOCUMENTS

| | | | | |
|---|---|---|---|---|
| 2,949,822 A * | 8/1960 | Walton | ..................... | B64D 1/04 294/82.26 |
| 4,076,435 A * | 2/1978 | Gueldner | .................. | F16B 1/00 244/3 |
| 4,185,764 A * | 1/1980 | Cote | ..................... | B65D 5/3685 229/104 |
| 4,196,879 A * | 4/1980 | Craigie | ..................... | B64D 7/08 244/137.4 |
| 4,257,639 A * | 3/1981 | Stock | ....................... | B64D 7/08 244/137.4 |
| 5,904,323 A * | 5/1999 | Jakubowski, Jr. | ....... | B64D 7/08 244/137.4 |
| 6,126,115 A * | 10/2000 | Carrier | ................... | B64G 1/641 244/137.4 |
| 7,506,570 B1 * | 3/2009 | Koski | ..................... | F41F 3/052 114/238 |
| 8,707,322 B2 * | 4/2014 | Graham | ............... | G06F 9/5077 709/213 |
| 2006/0097113 A1 * | 5/2006 | Landsberg | ............... | B64D 1/02 244/137.4 |

* cited by examiner

*Primary Examiner* — Paul T Chin
(74) *Attorney, Agent, or Firm* — Felix L. Fischer

(57) ABSTRACT

A modular testable release mechanism for payloads incorporates a housing and a flyaway plate separably engaged to the housing. A plurality of symmetrically positioned ejection springs are compressed between the flyaway plate and housing in an engaged position. A bolt extends through a first bore in the flyaway plate and is releasably secured in an actuator mounted on the housing symmetrically surrounded by the ejection springs. The flyaway plate is held in the engaged position with the housing by the bolt.

19 Claims, 5 Drawing Sheets

MODULAR TESTABLE RELEASE MECHANISM

STATEMENT REGARDING FEDERALLY SPONSORED RESEARCH OR DEVELOPMENT

This invention was made with Government support under HQ0147-15-C-0014 awarded by Department of Defense—Missile Defense Agency. The Government has certain rights in this invention.

BACKGROUND INFORMATION

Field

Embodiments of the disclosure relate generally to devices disengaging payloads from launch systems and more particularly to a system employing guided push-off springs integrated into a single housing secured to the launch vehicle with a mating fly-away plate mounted to the payload.

Background

Release of payloads from launch vehicles typically employs explosive bolts, compressed gas actuators or similar mechanisms. Prior art devices employing those solutions require refurbishment following testing. Other solutions use multiple non-explosive actuators such as clamp bands. However, simultaneous actuation of the clamp bands is difficult to achieve and potentially high kinematics angular errors may result in the release trajectory of the payload. Other solutions also require simultaneous integration with the payload and cannot be independently integrated at a modular level. A non-modular design is limited in use and offers no flexibility.

It is therefore desirable to provide a payload release mechanism which is modular and testable without refurbishment.

SUMMARY

Embodiments disclosed herein provide a modular testable release mechanism for payloads. The mechanism incorporates a housing and a flyaway plate separably engaged to the housing. A plurality of ejection springs are compressed between the flyaway plate and housing in an engaged position. A bolt extends through a first bore in the flyaway plate and is releasably secured in an actuator mounted on the housing symmetrically surrounded by the ejection springs. The flyaway plate is held in the engaged position with the housing by the bolt.

The disclosed embodiments provide a method for use of a modular testable release mechanism for payloads. A plurality of ejection springs are mounted symmetrically to a housing. A flyaway plate, mountable to a payload, is engaged by the ejection springs at a push-off surface. The flyaway plate and housing are urged together compressing the ejection springs and a bolt is inserted through a bore on the flyaway plate into an actuator. The bolt is torqued to a predetermined strain to withstand environmental loads and to compress the ejection springs to provide a preload for the desired potential energy to induce payload separation thereby releasably mating the flyaway plate and housing as a system. The system is tested by providing a firing pulse to the actuator to release the bolt and the system may then be reset for use.

The features, functions, and advantages that have been discussed can be achieved independently in various embodiments of the present disclosure or may be combined in yet other embodiments, further details of which can be seen with reference to the following description and drawings.

DETAILED DESCRIPTION

Embodiments disclosed herein provide a release system employing four guided push-off springs integrated into a single housing. The springs are compressed against a flyaway plate, which upon release of the system, flies away as an integrated part of the payload. Axial, lateral and torsional loads are carried at the separation plane between the housing and the flyaway plate. A single non-explosive actuator is utilized to maintain the springs in their compressed state and to preload the system to withstand environmental loads. Upon release of the actuator, the system preload is released and the guided push-off springs are free to impart an ejection velocity to the payload. The system does not utilize a clamp band at the separation plane, which could induce mechanical interference and tip-off upon release. Instead, a single preload bolt in combination with the non-explosive actuator is used to preload the system. The single preload bolt remains with the flyaway plate upon system release. By using a single non-explosive actuator, the system kinematics performance is not dependent on multiple actuators releasing simultaneously. Precise preloading is achieved via a strain gauge integrated in the preload bolt with an integrated strain gauge connector interface on the housing. The system is completely modular in that it is fully preloaded prior to integration into the vehicle. The system is completely testable and resettable without any need for refurbishment prior to reuse for flight.

Figure 1:
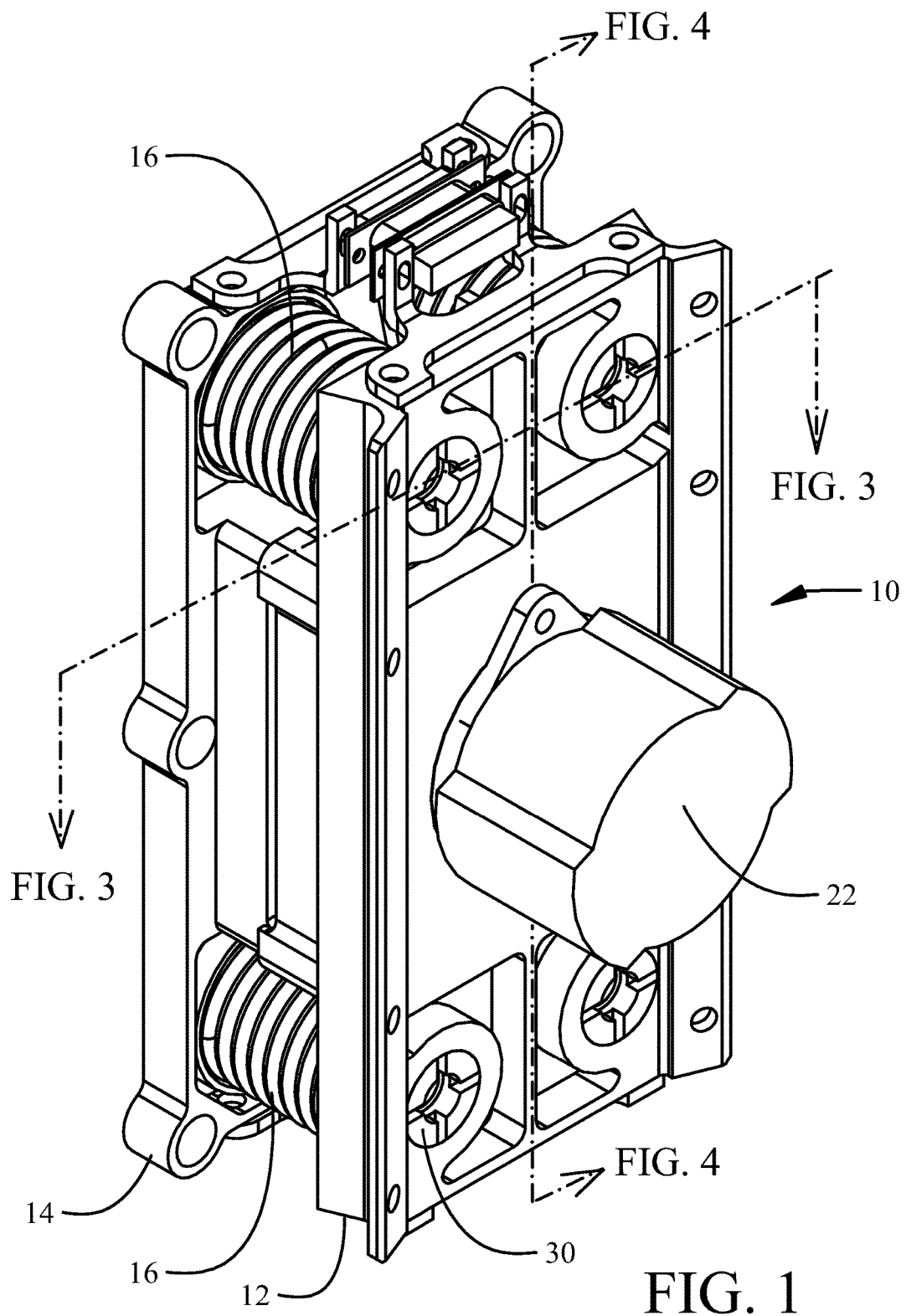
FIG. 1 is a pictorial representation of an exemplary embodiment of the modular testable release mechanism.
Figure 2:
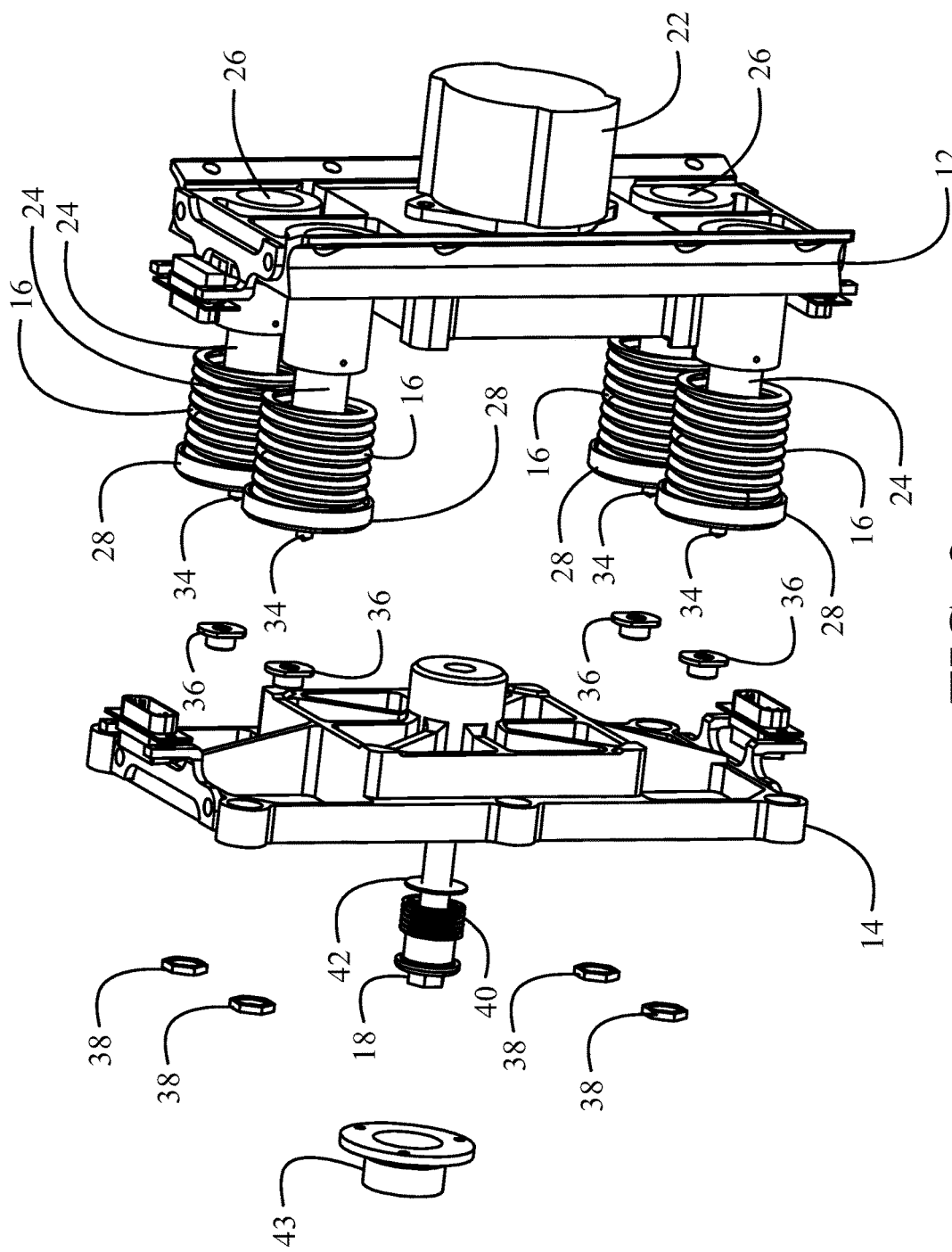
FIG. 2 is an exploded view of the embodiment of FIG. 1.

Referring to the drawings, a first embodiment of the release mechanism 10 is shown in FIGS. 1 and 2. A housing 12 is employed as an interface to the backbone structure of the launch vehicle. A flyaway plate 14 is fixed to the payload and separably engaged to the housing 12. Compressible members, ejection springs 16 in the embodiment shown, are symmetrically positioned and compressed between the flyaway plate 14 and housing 12 in an engaged position. For the exemplary embodiment four ejection springs 16 are employed in a symmetric quadrilateral pattern. However, in alternative embodiments three or more flexible members may be employed to symmetrically provide even and stable distribution of the desired separation force upon release, as will be described subsequently. The flyaway plate is held in the engaged position with the housing by a bolt 18 extending through a first bore 20 in the flyaway plate 14 and releasably secured in an actuator 22 mounted on the housing symmetrically surrounded by the ejection springs 16.

Figure 3:
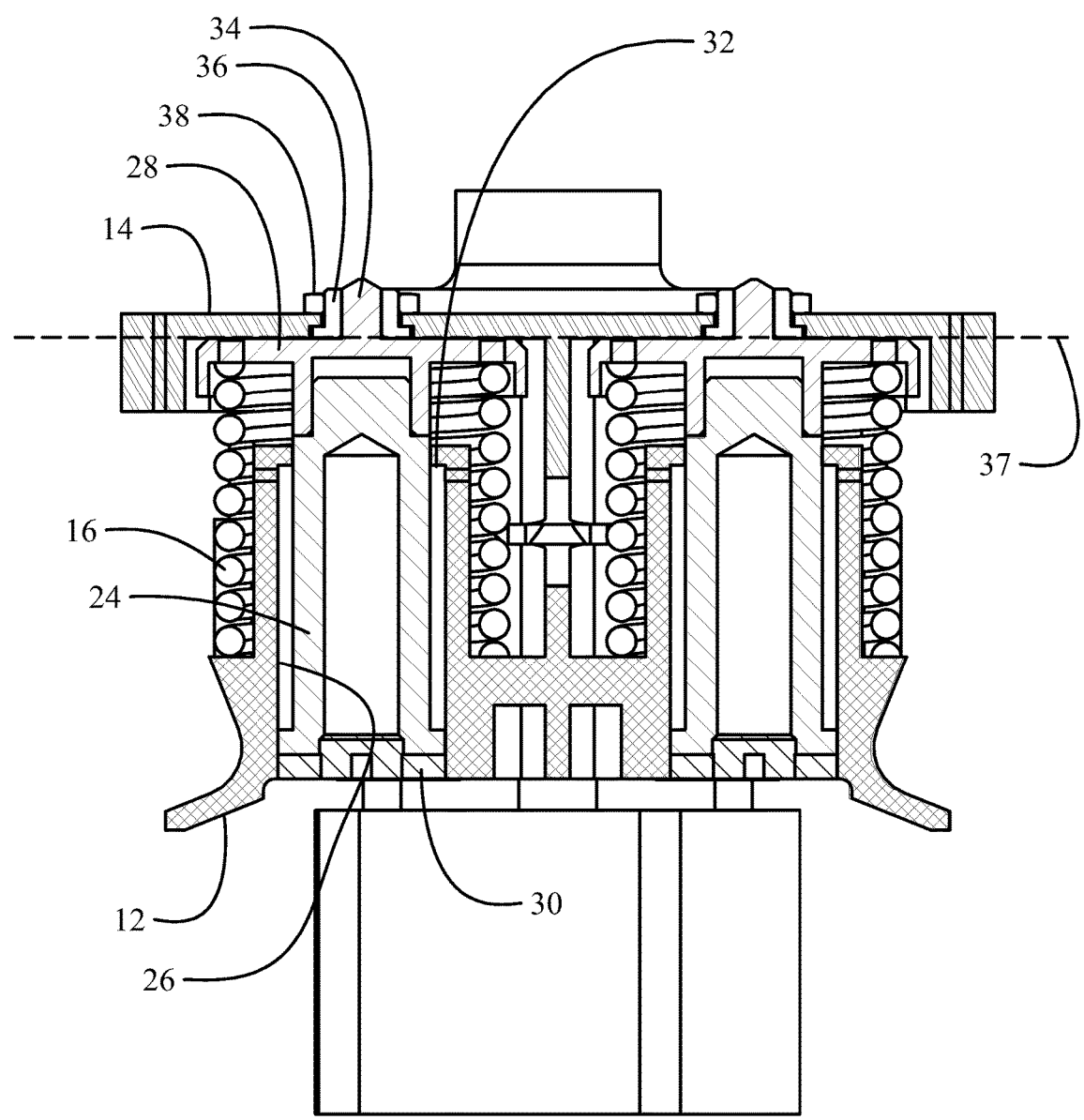
FIG. 3 is a top section view of the embodiment along lines FIG. 3-FIG. 3 in FIG. 1.

The springs 16 are secured to the housing 12 with concentrically inserted telescoping spring stops 24 received in extension bores 26 in the housing 12. A spring cap 28 extends over the spring 16 constraining the spring on the spring stop 24. A flange 30 on a terminal end of the spring stop 24, best seen in FIG. 3, is received against a shoulder 32 in the extension bore 26 to terminate the extension stroke of the spring stop. Guide pins 34 centered on the spring caps 28 are received in pin bushings 36 secured to the flyaway plate 14 and the spring caps are urged against a push-off surface 37. For the embodiment shown the bushings 36 are received through bores in the flyaway plate and secured with nuts 38. Close engagement of the spring stops 24 in the extension bores 26 in combination with the guide pins 34 extending through the push-off surface 37 and engaging the bushings 36 in the flyaway plate assures linear motion of the releasing system to avoid tip off or angular errors being induced in the trajectory of the payload when released.

Figure 4:
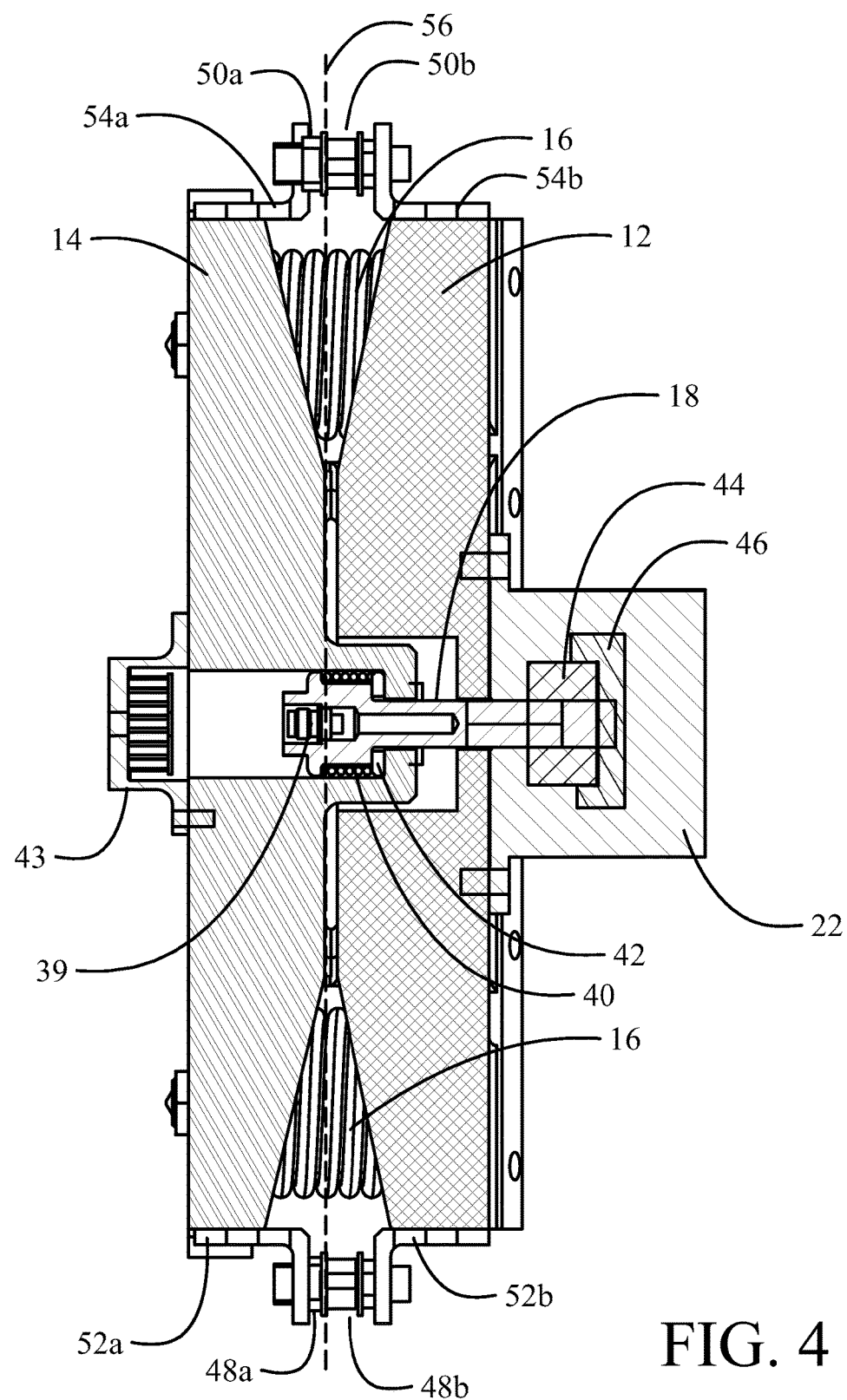
FIG. 4 is a side section view of the embodiment along lines FIG. 4-FIG. 4 in FIG. 1; and, FIG. 5 is a flow chart of a method employing a modular testable release mechanism of the embodiment described.

Engagement of the flyaway plate 14 to the housing 12 while compressing the ejection springs 16 is accomplished with the bolt 18 which may incorporate an integral strain gage 39 as seen in FIG. 4. A compression spring 40 is concentrically received on the bolt 18 with a stop washer 42. A cap 43, which may be crushable, is employed to absorb the bolt energy and constrain the bolt 18 upon release. The cap 43 additionally provides environmental protection for the head of the bolt 18. The bolt remains retracted from the actuator after release under load from the compression spring 40. Actuator 22, which for the exemplary embodiment employs a segmented nut 44 with a shape memory alloy (SMA) trigger 46, releasably receives the bolt 18 which may be torqued to the desired strain to provide optimum compression of the ejection springs 16. For the exemplary embodiment a Hold Down Release Mechanism (HDRM) 10K available from Sierra Nevada Corporation may be employed as the actuator which provides up to 10,000 lbs of preload capability and the SMA trigger may be activated and reset to provide a non-pyrotechnic separation capability while still responsive to a standard pyrotechnic firing pulse. The central single point connection of the bolt 18 to the actuator 22 allows a single point release with the springs 16 symmetrically spaced about the connection point without the use of clamp bands or similar actuation schemes. For the exemplary embodiment the actuator 22 is mounted to the housing with the bolt 18 inserted through and constrained in the flyaway plate 14 to provide reduced mass in the separating elements. However, in certain embodiments, the actuator may be mounted to the flyaway plate with the bolt inserted through the housing.

Umbilical connectors 48a, 48b and 50a, 50b are mounted to the flyaway plate 14 and housing 12 with associated brackets 52a, 52b and 54a, 54b to provide power and communications links between the launch vehicle and payload. Mirrored positioning of the umbilical connectors on the separation plane 56 provides symmetrical separation forces during release.

Figure 5:
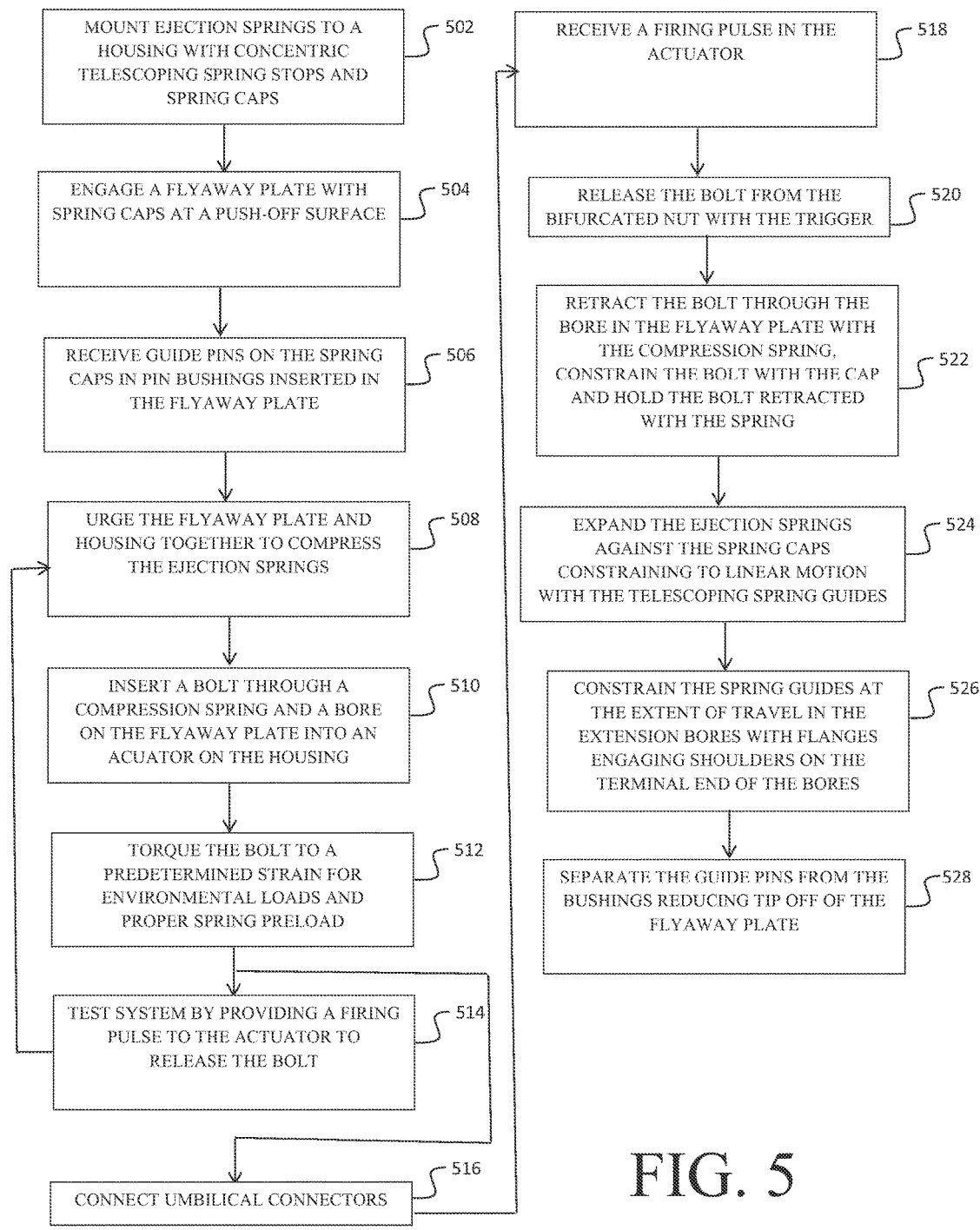

A method for assembly and operation of the release mechanism 10 is shown in FIG. 5 with reference to the prior drawings for physical element identification. A plurality of ejection springs 16 are mounted to a housing 12 with concentric telescoping spring stops 24 and restrained with spring caps 28, step 502. A flyaway plate 14, mountable to a payload, is engaged with the spring caps 28 at a push-off surface 17, step 504, and guide pins 34 are received in pin bushings 36 inserted in the flyaway plate, step 506. The flyaway plate 14 and housing 12 are urged together compressing the ejection springs 16 and retracting telescoping spring guides 24 into extension bores 26, step 508. A bolt 18 with an integral strain gage 39 is inserted through a compression spring 40 and a bore 20 on the flyaway plate 14 into an actuator 22 having a bifurcated nut 44 constrained with an SMA trigger 46, step 510. The bolt 18 is torqued to a predetermined strain to withstand environmental loads and to compress the ejection springs 16 to provide the proper preload for the desired potential energy to induce payload separation, step 512, thereby releasably mating the flyaway plate and housing as a system. The system may be tested by providing a firing pulse to the actuator 22 to release the bolt 18, step 514, and the system reset by performing steps 508 to 512. For the embodiment shown umbilical connectors 48a, and 48b, and 50a, 50b are connected at the separation plane either by engagement during mating of the housing 12 and flyaway plate 14 or subsequently, step 516.

For release of a payload attached to the flyaway plate 14, a firing pulse is received by the actuator 22, step 518, causing the trigger 46 to release the bolt 18 from the bifurcated nut 44, step 520. The bolt 18 is retracted through the bore 20 in the flyaway plate 14 by compression spring 40, constrained by cap 43 and held retracted by the spring, step 522. The ejection springs 16 expand against the spring caps 28 with linearly constrained motion provided by the telescopic extension of the spring guides 24 in the extension bores 26, step 524. At the extent of their travel, the spring guides 24 are constrained in the extension bores 26 by flanges 30 engaging shoulders 32 at the terminal end of the bores, step 526, constraining the ejection springs 16 and spring caps 28 for separation at the push-off surface 37. Guide pins 34 then separate from the bushings 36, step 528, reducing any tip off of the flyaway plate 14 as it separates from the housing 12.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A modular testable release mechanism for payloads, the mechanism comprising:
   a housing;
   a flyaway plate separably engaged to the housing;
   a plurality of symmetrically positioned ejection springs compressed between the flyaway plate and housing in an engaged position;
   a bolt extending through a first bore in the flyaway plate and releasably secured in an actuator mounted on the housing symmetrically surrounded by the ejection springs, the flyaway plate held in the engaged position with the housing by the bolt.

2. The modular testable release mechanism for payloads as defined in claim 1 wherein the ejection springs are secured to the housing with concentrically inserted telescoping spring stops received in extension bores in the housing.

3. The modular testable release mechanism for payloads as defined in claim 2 further comprising a spring cap extending over each ejection spring constraining the spring on the spring stop.

4. The modular testable release mechanism for payloads as defined in claim 3 further comprising a flange on a terminal end of each spring received against a shoulder in the extension bore to terminate an extension stroke of the spring stop.

5. The modular testable release mechanism for payloads as defined in claim 4 further comprising a guide pin centered on each spring cap received in a pin bushing secured to the flyaway plate when the spring caps are urged against a push-off surface.

6. The modular testable release mechanism for payloads as defined in claim 5 wherein each pin bushing is received through a bore in the flyaway plate and secured with a nut.

7. The modular testable release mechanism for payloads as defined in claim 1 wherein the bolt incorporates an integral stain gage.

8. The modular testable release mechanism for payloads as defined in claim 7 further comprising a compression spring concentrically received on the bolt, urging the bolt to retract upon release and a cap received over the bolt to absorb the bolt energy and constrain the bolt upon release.

9. The modular testable release mechanism for payloads as defined in claim 1 wherein the actuator comprises a segmented nut with a shape memory alloy (SMA) trigger releasably receiving the bolt.

10. A method for use of a modular testable release mechanism for payloads, the method comprising:
   mounting a plurality of ejection springs symmetrically to a housing;
   engaging a flyaway plate, mountable to a payload, with the ejection springs at a push-off surface;
   urging the flyaway plate and housing together compressing the ejection springs;
   inserting a bolt through a bore on the flyaway plate into an actuator;
   torquing the bolt to a predetermined strain to compress the ejection springs to provide a preload for the desired potential energy to induce payload separation releasably mating the flyaway plate and housing as a system;
   testing the system by providing a firing pulse to the actuator to release the bolt; and
   resetting the system.

11. The method as defined in claim 10 wherein the step of mounting a plurality of ejection springs further comprises:
   receiving concentric telescoping spring stops in the ejection springs; and,
   restraining the ejection springs with spring caps.

12. The method as defined in claim 11 further comprising receiving guide pins extending from the spring caps in pin bushings inserted in the flyaway plate.

13. The method as defined in claim 12 wherein the step of urging the flyaway plate and housing together further comprises retracting the telescoping spring guides into extension bores.

14. The method as defined in claim 10 further comprising engaging umbilical connectors at the separation plane at the extent of the compression.

15. The method as defined in claim 10 wherein the bolt has an integral strain gage and further comprising measuring the predetermined strain with the integral strain gage.

16. The method as defined in claim 10 wherein the step of inserting the bolt further comprises inserting the bolt through a concentric compression spring and the step of testing the system further comprises retracting the bolt upon release.

17. The method as defined in claim 13 further comprising:
   receiving a firing pulse in the actuator;
   releasing the bolt;
   expanding the ejection springs against the spring caps with linearly constrained motion provided by the telescopic extension of the spring guides in the extension bores;
   constraining the spring guides in the extension bores to constrain the ejection springs and spring caps for separation at the push-off surface; and,
   separating the guide pins from the bushings.

18. The method as defined in claim 17 further comprising:
   retracing the bolt through the bore with the compression spring;
   constraining the bolt with cap; and,
   holding the bolt retracted with the spring.

19. The method as defined in claim 17 wherein the step of constraining the spring guides comprises engaging flanges on the spring guides with shoulders at a terminal end of the bores.

\* \* \* \* \*